United States Patent Office 3,759,709
Patented Sept. 18, 1973

3,759,709
METHOD FOR PRODUCING POROUS METAL PRODUCTS
Joseph J. Asbury, Knoxville, Tenn., assignor to the United States of America as represented by the United States Atomic Energy Commission
No Drawing. Filed Apr. 28, 1970, Ser. No. 32,766
Int. Cl. B22f 1/00
U.S. Cl. 75—211   3 Claims

ABSTRACT OF THE DISCLOSURE

Porous metal products having wall thicknesses of about 1.0 to about 6.0 inches and porosities in the range of about 20 to 70 percent with interconnecting pores are prepared by filling a receptacle with fine metal powder, heating the metal to a temperature slightly below the sintering temperature of the metal, maintaining the lower temperature for a duration sufficient to provide a temperature equilibrium throughout the powder, increasing the temperature of the metal to the sintering temperature thereof, and immediately thereafter decreasing the temperature to inhibit further sintering.

---

The present invention relates generally to porous metal products having interconnecting pores, and more particularly to the method for preparing such products. This invention was made in the course of, or under, a contract with the U.S. Atomic Energy Commission.

In the metal working art vacuum chucks are often used to hold a part or workpiece in a lathe or other machining device in such a manner as to prevent damage to the part while at the same time providing an adequate holding mechanism for maintaining the part in a working relationship with a machine tool. However, the machining of soft metals and other relatively soft materials by employing vacuum chucks did not prevent the metal or material from being damaged since grooves in conventional vacuum chucks necessary for effecting the part-holding vacuum caused excessive surface damage to the part. Efforts to overcome this problem of damaging the material or metal being machined included the provision of a porous cushion between the vacuum chuck and the workpiece during the machining operations to prevent the material from being damaged by the chuck. The cushion material must be of a type which will maintain a high vacuum between the chuck holding the cushion and the workpiece and yet prevent or minimize damage to the workpiece. This cushion material must also have sufficient strength to retain the workpiece during high-speed machining operations. Carbon and graphite liners have been employed in vacuum chucks, but it has been found that these particular liners are sufficiently pliable to inhibit or limit their utility in many machining operations. The fabrication of a liner from porous metal appeared to be the most desirable approach, but a metal liner of the dimensions necessary for machining large parts is not readily producible by employing previously known techniques. For example, one of the more successful procedures of preparing porous metal products comprises the admixture of a metal powder with a binder which is volatile at a temperature below the sintering temperature of the metal. This admixture is placed in a form of the desired configuration, confined in a suitable furnace, and heated to the temperature sufficient to sinter the metal to produce a sintered structure. While this metal product is porous, such porous metal structures are necessarily of relatively small thicknesses since the binder is difficult to volatilize from thicker structures so as to inhibit the provision of interconnecting pores throughout the structure. Accordingly, this porous metal structure is somewhat limited in its uses because it is of a wall thickness which would be well below that necessary for use as a liner in a vacuum chuck or, for that matter, in other applications where permeable metal structures of wall thicknesses greater than about 1.0 inch would be employed, e.g., filters and the like.

Accordingly, it is an object or the aim of the present invention to provide a porous metal structure of a size which will be useable in applications such as porous liners for vacuum chucks which require dimensions in the range of about 9.5 inches in diameter with a wall thickness of about 1.0 inch or greater. Porous metal structures prepared by the present invention are characterized by high porosity ranging from about 20 percent upwards to about 70 percent and by interconnecting pores which make the product permeable throughout its entire thickness, by the uniformity of pores, by easy machinability which helps to provide a smooth workpiece-contacting surface, and by high strength which will allow its use in applications where the strength of the porous material would be critical such as in vacuum chucks. The porous metal products of the present invention are prepared by placing a desired quantity of fine powder of a particular metal into a furnace, heating the furnace to a temperature slightly below the sintering temperature of the metal, maintaining this temperature for a duration sufficient to provide a temperature equilibrium throughout the mass of powder, heating the powder to a temperature which will provide sintering, and immediately thereafter, i.e., no hold time, decreasing the temperature below the sintering temperature to provide a highly porous product. The extent of sintering obtained is sufficient to maintain the integrity of the product and yet provide the aforementioned characteristics of porosity, interconnecting pores, and strength.

While the pesent invention is primarily described as being used for the manufacture of porous liners for use in vacuum chucks of metal working systems, it is to be understood that the method of the present invention can be employed for manufacture of permeable metal structures which may be used in other applications such as filters and the like.

In accordance with the process of the present invention, porous and highly permeable metal products are prepared by employing a novel sintering operation which comprises the steps of determining the sintering temperature of a fine powder of a particular metal, confining a sufficient quantity of this metal powder in a mold of a desired configuration, heating the confined powder to a temperature slightly below the temperature found to be the sintering temperature of the metal powder, maintaining approximately this temperature for a duration sufficient to provide a temperature equilibrium throughout the entire mass of powder, heating the powder to at least the sintering temperature, and immediately thereafter, with no hold time, decreasing the temperature of the powder to a temperature below the sintering temperature thereof. During this short duration which the metal powder is at sintering temperature, light sintering of the metal powder occurs to provide a permeable product. The effect of the sintering is greatest at the outer surfaces of the product, with the extent of sintering decreasing as the thickness of the product increases. However, with heat applied only to the outermost surface the sintering is sufficient to produce tenacious joining of the particulates at depths up to about 2 inches from the outer surface. On the other hand, with heat applied to both the inner and outer surfaces as in the case of a tubulation or a cone-shaped liner, adequate sintering occurs through powder depths as great as 4 to 6 inches. The duration during which the metal powder is at sintering temperature as provided by no hold time is somewhat critical to the porosity and permeability of the product in that a relatively slight increase in the duration at the sintering temperature causes a corresponding decrease in the porosity of the product. For example, data obtained from one experiment where the sintering temperature was attained and then rapidly decreased by terminating the heat input so as to, in effect, provide no hold time at the sintering temperature provided a stainless steel product with 50 percent porosity. Conversely, the same metal powder maintained at sintering temperature for a relatively short period of only 30 minutes reduced the porosity of the sintered product to 20 percent.

A porous metal product fabricated by practicing the present invention may be of any desired configuration such as the generally cone-shaped configuration for use in vacuum chuck applications or as tubulations, cubes, disks, and any other desired configuration which may be useful for the intended purpose. The dimensions and wall thicknesses of the product are not limited as known heretofore in that the products may vary from about 9 inches in diameter and have wall thicknesses anywhere from about 1 inch or less up to 6 inches, depending upon the particular use envisioned. The metals useable in the formation of porous products with interconnecting porosity or permeability include nickel, iron, copper, various types of stainless steels, beryllium, tungsten, other refractory metals, and alloys of such metals.

The porous products are preferably prepared by employing a powder of a sieve size less than 325 mesh (Tyler). The use of such fine powder is important to the success of the method in that, with the larger surface area provided by the fine powder, sintering occurs more rapidly due to a greater number of contact points being present between adjacent particulates. With powder of larger mesh size, say, above about 200 mesh, the surface area and points of contact decrease significantly and the size of the particulates increases, which together cause sintering to be more difficult to achieve. Accordingly, higher temperatures and longer hold times at the sintering temperature are required to produce the sintered product, which in turn cause the product to be less porous, particularly since the larger particulates, when sintered, naturally detract from the void volume in the product.

As briefly mentioned above, the invention is practiced by initially determining the sintering temperature of the particular powder being employed. This sintering temperature may be readily found by filling a small refractory crucible, e.g., alumina, with powder of the mesh size and type to be sintered. The filled crucible is placed in a furnace and heated until the temperature at which sintering of the powder occurs is reached. For example, with Type 304 stainless steel powder of −325 mesh, the sintering temperature is 1100° C. With the sintering temperature known, a quantity of this stainless steel powder is placed in a mold of the desired configuration and then the temperature increased to less than 1100° C., e.g., about 1000°–1050° C., for a duration sufficient to provide a temperature equilibrium of about 1000°–1050° C. through the entire mass of the confined powder. The temperature of the powder is then increased rapidly to 1100° C. and then immediately thereafter the heating of the powder is terminated so as to provide essentially no hold time at 1100° C. During this short duration at the sintering temperature the powder rapidly sinters throughout the mass with the sintering occurring as the temperature gradient passes through the mass from the outer surface towards the inner surface, thereby providing a greater sintering at the surface, yet leaving a sintered product with open porosity. With a duration at the sintering temperature corresponding to no hold time, a product is provided with a porosity of about 50.24 percent. A duration of 30 minutes at the sintering temperature causes a corresponding decrease in the porosity to where it is only about 20 perecnt. Hence, by practicing the method of the present invention and regulating the duration the powders are at their respective sintering temperatures, the porosity of the products may be readily controlled to be most suitable for the purpose envisioned.

The fabrication of the porous metal products is preferably achieved by placing the powder in an inert atmosphere such as argon and heating the powder in such a way as to provide the desired thickness in the most reasonable manner. For example, if a cone-shaped configuration with a 4-inch wall thickness is desired, the most appropriate way of forming the cone is to simultaneously heat the powder at the inner and outer surfaces of the cone. If a thinner-walled cone is desired, say, about 2 inches, heating from the outside would be sufficient. Resistance-heated furnaces have been found to be appropriate for practicing the method of the present invention.

The compressive strength and the yield strength of the products are somewhat dependent upon the metal employed and the particular porosity of the products. However, in all instances, the greater the porosity, the lesser the strength of the product. For example, with a porous Type 304 stainless steel product having a porosity of about 39 percent, the compressive strength is approximately 38,000 p.s.i., whereas a compact with about 50 percent porosity of the same material has a compressive strength of about 1000 p.s.i. Also, the yield strength of this product decreases from about 5000 p.s.i. to about 100 p.s.i., respectively. Like the strength of the material, the density similarly decreases with increasing porosity to where the density of the porous product may be regulated by varying its porosity, which feature may find useful application where the use of a particular metal is desired. In the table below there are illustrated the density, compressive strengths, and sintering temperatures of various porous products produced in accordance with the method of the present invention. The stainless steels found useable are those in the Type 300 series.

TABLE I

Density and compressive strengths of pressureless sintered porous metals

| Density (gms./cc.) | Material type | Sintering temp. (° C.) | Percent porosity | Ultimate compressive strength (p.s.i.) | Maximum stress applied without failure (p.s.i.) | Approximate yield stress (p.s.i.) |
|---|---|---|---|---|---|---|
| 3.950 | 316 SS | 1,200 | 50.38 | | 51,000 | 3,900 |
| 3.498 | 316 SS | 1,200 | 55.94 | 13,700 | | 1,500 |
| 4.747 | 304 SS | 1,100 | 40.21 | | 51,000 | 5,000 |
| 4.840 | 304 SS | 1,100 | 39.04 | 38,100 | | 5,000 |
| 4.176 | 304 SS | 1,100 | 47.41 | 8,400 | | 1,500 |
| 4.355 | 304 SS | 1,100 | 45.15 | 5,090 | | 760 |
| 4.623 | 304 SS | 1,100 | 49.33 | 1,220 | | 100 |
| 3.950 | 304 SS | 1,100 | 50.24 | 1,110 | | 95 |
| 3.525 | 301 SS | 1,100 | 55.60 | 29,300 | | 5,000 |
| 3.225 | 301 SS | 1,100 | 59.38 | 8,150 | | 690 |
| 3.066 | Copper | 600 | 65.63 | 1,030 | | 60 |
| 2.945 | do | 600 | 66.98 | 740 | | 100 |
| 2.999 | do | 600 | 66.38 | 500 | | 90 |
| 4.121 | Nickel | 900 | 53.70 | 2,030 | | 950 |
| 4.266 | Iron | 1,000 | 45.73 | | 51,000 | 4,900 |
| 1.194 | Beryllium | 1,150 | 34.46 | 40,130 | | 7,450 |
| 1.35 | do | 1,150 | 27.03 | 64,330 | | 12,740 |
| 0.94 | do | 1,150 | 49.19 | 8,730 | | 2,900 |
| 10.957 | Tungsten | 1,900 | 42.00 | 24,190 | | |
| 8.77 | do | 1,900 | 52.00 | 3,000 | | |
| 5.53 | do | 1,900 | 70.00 | 970 | | |

In addition to the pressureless sintering procedure as described above and set forth in the above table, porous products may be prepared by isostatically pressing and sintering the various metals. As illustrated in Table II below, Type 304 stainless steel powder may be fabricated into compacts of various densities. As will appear clear, with increasing pressures or stress upon the powder, the density increases and the porosity decreases. This compaction and sintering procedure may be employed with any of the aforementioned metal powders. However, the percent porosity obtainable by using an isostatic pressing procedure is not as great as that obtained by pressureless sintering, as described above.

TABLE II

Density of compacts isostatically pressed and sintered from Type 304 stainless steel

| Pressing pressure (p.s.i.) | Density (gms./cc.) | Percent porosity |
|---|---|---|
| 10,000 | 5.121 | 35.26 |
| 15,000 | 5.358 | 31.45 |
| 20,000 | 5.561 | 26.70 |
| 25,000 | 5.881 | 26.28 |
| 30,000 | 5.980 | 22.85 |

The invention is further illustrated by the following example in which a liner for a vacuum chuck is prepared from Type 304 stainless steel powder.

EXAMPLE

A cone-shaped tantalum mold having an inside diameter of 3.25 inches at the top and 9.25 inches at the bottom was placed on a 0.25-inch-thick tungsten plate inside a tungsten element furnace. The cylinder was filled with −325 mesh powder and heated to 1050° C. in an argon atmosphere for approximately 30 minutes to provide a temperature equilibrium throughout the entire powder mass. The temperature of the furnace was then increased to 1100° C. to initiate sintering of the powder, but further sintering of the powder was prevented by rapidly decreasing the temperature after it had attained this temperature of 1100° C. The lightly sintered powder was removed from the furnace and machined into a liner for a vacuum chuck. Analytical data indicate that the porosity of the liner was 50.24 percent and that the pores were interconnecting throughout the entire thickness of the liner. The density of this liner was 3.95 gms./cc. and the yield strength was approximately 95 p.s.i.

It will be seen that the present invention provides a novel, yet relatively simple, technique of sintering large, thick, porous metal structures. The porous structures of the present invention can be prepared in various density ranges with much greater accuracy and simplicity than heretofore obtainable while maintaining a high degree of permeability and porosity with interconnecting and uniform pores which provide a uniform strength throughout the compact and can be readily machine to provide smooth surfaces.

What is claimed is:

1. A method of fabricating a porous metallic structure having interconnecting pores, comprising the steps of amassing a quantity of discrete metal particulates of a sieve size range less than 325 mesh in a contiguously disposed relationship, confining the particulates in an inert atmosphere, heating the particulates to a temperature below but approximately equal to the temperature at which rapid sintering occurs, maintaining the first-mentioned temperature for a duration sufficient to insure that the particulates are at a temperature equilibrium but insufficient to cause significant sintering of the particulates, further heating the particulates to a temperature adequate to effect rapid sintering of the particulates into a cohesive body, and terminating the heating of the particulates essentially concurrently with the attainment of the last mentioned temperature for decreasing the temperature of the particulates to inhibit further sintering of the particulates.

2. The method of fabricating a porous metallic structure as claimed in claim 1, wherein the metal particulates consist essentially of a metal selected from the group consisting of Type 300 stainless steels, copper, iron, beryllium, nickel, and tungsten.

3. The method of fabricating a porous metallic structure as claimed in claim 2, including the additional step of stressing the particulates with a force corresponding to 10,000 to 30,000 p.s.i. prior to heating.

References Cited

UNITED STATES PATENTS

| 2,082,126 | 6/1937 | Schulz | 75—221 X |
| 2,672,415 | 3/1954 | Balile | 75—221 X |

OTHER REFERENCES

Goetzel, C. G., Treatise on Powder Metallurgy, New York, Interscience, 1948, vol. 1, pp. 505–514, 536–8. TN 645 G6.

CARL D. QUARFORTH, Primary Examiner

R. E. SCHAFER, Assistant Examiner

U.S. Cl. X.R.

75—214